United States Patent
Krishnamurthi et al.

(10) Patent No.: US 9,503,558 B1
(45) Date of Patent: Nov. 22, 2016

(54) BATTERY MODULE FOR COMMUNICATION DEVICES HAVING AN ACCESSORY INTERFACE

(71) Applicant: MOTOROLA SOLUTIONS, INC., Schaumburg, IL (US)

(72) Inventors: Macwien Krishnamurthi, Selangor (MY); Kow Chee Chong, Penang (MY); Cheah Chan Kee, Penang (MY); Cheah Heng Tan, Penang (MY); Yusasmadi Yusof, Penang (MY)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 14/728,823

(22) Filed: Jun. 2, 2015

(51) Int. Cl.
*H04B 1/38* (2015.01)
*H04M 1/725* (2006.01)
*H04B 1/3883* (2015.01)

(52) U.S. Cl.
CPC ....... *H04M 1/72527* (2013.01); *H04B 1/3883* (2013.01)

(58) Field of Classification Search
CPC ................. H02M 2001/0032; H02J 5/005
USPC ...... 455/550.1, 573, 456.4, 462, 556.1, 572; 340/538, 7.37, 571, 686.6; 439/218, 439/676
See application file for complete search history.

(56) References Cited

U.S. PATENT DOCUMENTS

| | | | |
|---|---|---|---|
| 4,879,759 A | 11/1989 | Matsmoto et al. | |
| 5,181,023 A | 1/1993 | Fujii | |
| 5,353,017 A | 10/1994 | Suzuki et al. | |
| 5,787,168 A | 7/1998 | Lien | |
| 5,832,388 A | 11/1998 | Williams et al. | |
| 5,867,798 A * | 2/1999 | Inukai | H02J 7/0004 320/115 |
| 6,237,023 B1 | 5/2001 | Yoshimoto | |
| 7,535,357 B2 | 5/2009 | Enitan et al. | |
| 8,174,380 B2 * | 5/2012 | Travis | G06F 1/1632 340/12.32 |
| 2004/0148115 A1 * | 7/2004 | Ching | G06F 1/3246 702/63 |
| 2009/0124299 A1 * | 5/2009 | Suzuki | H02J 7/0091 455/573 |

FOREIGN PATENT DOCUMENTS

WO 2011015900 2/2011

OTHER PUBLICATIONS

PCT/US2016/032613 International Search Report and Written Opinion of the International Searching Authority dated Sep. 28, 2016 (11 pages).

* cited by examiner

*Primary Examiner* — Kiet Doan
(74) *Attorney, Agent, or Firm* — Michael Best & Friedrich LLP

(57) ABSTRACT

A battery module for a portable communication device having a controller. In one embodiment, the battery module includes a battery accessory interface having a positive terminal, an identifying terminal, and a negative terminal. A voltage regulator is connected to the positive terminal of the battery accessory interface and configured to output a voltage on the positive terminal in response to a control signal. An addressable switch is connected to the identifying terminal of the battery accessory interface. The addressable switch is configured to communicate with the controller and generate the control signal based on input from the controller and the identifying terminal.

17 Claims, 8 Drawing Sheets

| ACCESSORY | LINE 152 | LINE 154 | LINE 156 | LINE 158 | LINE 160 |
|---|---|---|---|---|---|
| VIBRATOR | O | O | O | O | S |
| FLASH LIGHT | O | O | O | S | O |
| GAS DETECTOR | O | O | O | S | S |
| ⋮ | | | | | |
| $2^5$ DEVICE TD | S | S | S | S | S |

O=OPEN, S=SHORT

FIG. 7

BATTERY MODULE FOR COMMUNICATION DEVICES HAVING AN ACCESSORY INTERFACE

BACKGROUND OF THE INVENTION

Portable communication devices, for example, two-way radios, are typically powered by one or more batteries. In many portable communication devices, batteries are located in a portion of a housing that is opposite the side or portion of the portable communication device in which, for example, user controls, displays, screens, microphones, and speakers are located. Sometimes, the portion of the portable communication device where the battery resides is referred to as the "battery side."

It is often convenient for a user of a portable communication device to carry that device on a belt worn around the user's waist using a belt clip connected to the portable communication device. In many devices, the belt clip is connected to the battery side of the portable communication device. When a user carries a portable communication device using a belt clip, it is often desirable that the belt clip be configured to vibrate so that the user may be alerted via the vibration (rather than, for example, an audible alarm or ring) to an incoming call, incoming message, or other event. However, existing mechanisms for providing appropriate power to vibrating motors are not completely satisfactory and may rely on connections, for example Global Core Accessory Interface (GCAI) connections, that require a cable or wires to transfer power, information, or both from the portable communication device to the belt clip.

Accordingly, there is a need for a battery accessory interface.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a table of connections between the enhanced battery interface shown in FIG. 6 and an accessory.

Figure 1:
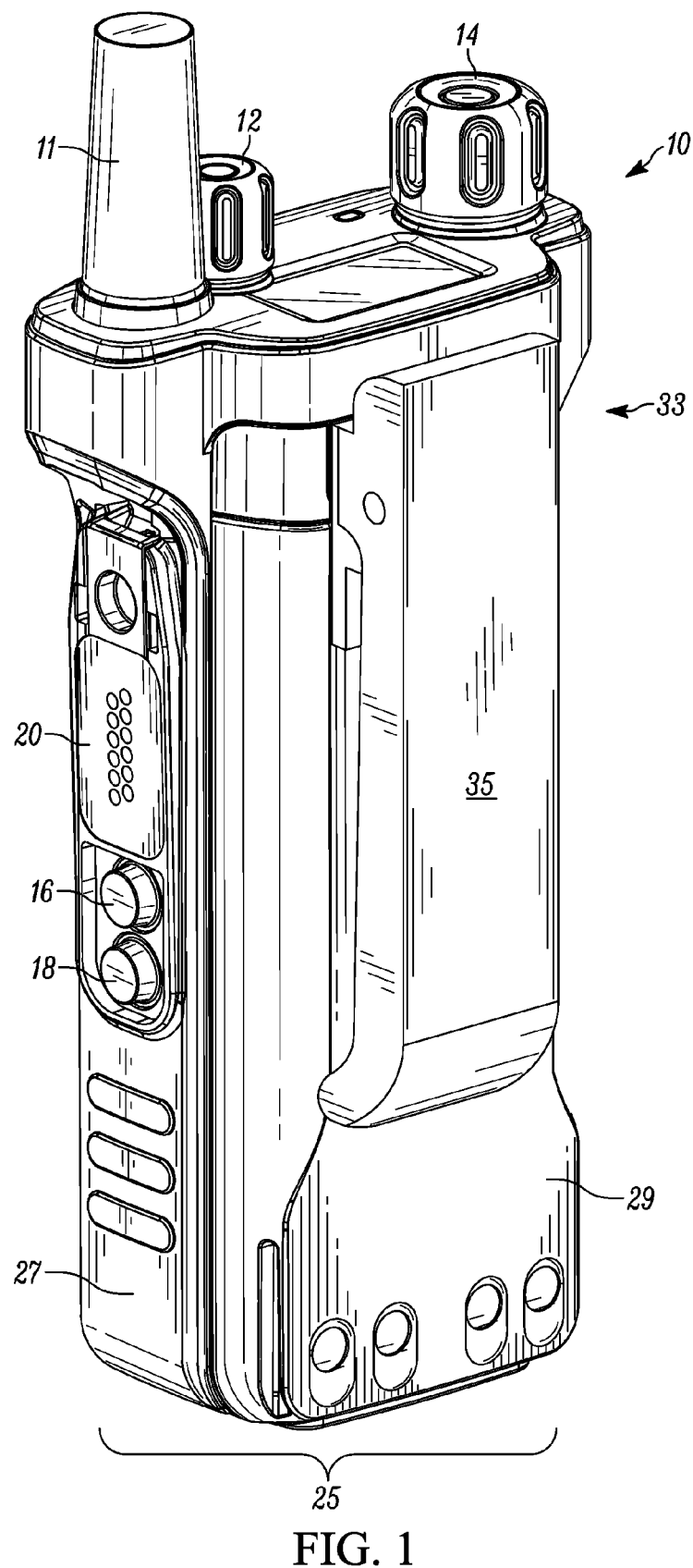
FIG. 1 is a perspective view of a portable communication device having a battery accessory interface in accordance with some embodiments and a passive belt clip.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a battery module for a portable communication device having a controller. The battery module includes a battery accessory interface having a positive terminal, an identifying terminal, and a negative terminal. A voltage regulator is connected to the positive terminal of the battery accessory interface and configured to output a voltage on the positive terminal in response to a control signal. An addressable switch is connected to the identifying terminal of the battery accessory interface. The addressable switch is configured to communicate with the controller and generate the control signal based on input from the controller and the identifying terminal.

FIG. 1 illustrates a portable communication device 10, for example, a two-way radio. The device 10 includes an antenna 11, various controls such as knobs 12 and 14, control buttons 16 and 18 (for example, volume control) and a push-to-talk button 20. The portable communication device 10 includes a housing 25 that has a first portion 27 and a second portion 29. The second portion 29 of the housing 25 includes within it a rechargeable battery or battery pack (discussed below) for powering the portable communication device 10 and is referred to as a "battery side" of the housing. The second portion 29 of the housing 25 includes a battery accessory interface 33 partially therein and partially exposed (see FIG. 4).

A belt clip 35 is connected to the second portion 29 of the housing 25. The belt clip 35 is a passive clip, meaning that it has no electrical or electronic operations and acts solely as mechanical connection for maintaining the device 10 on a belt (not shown) of a user (also not shown).

Figure 2:
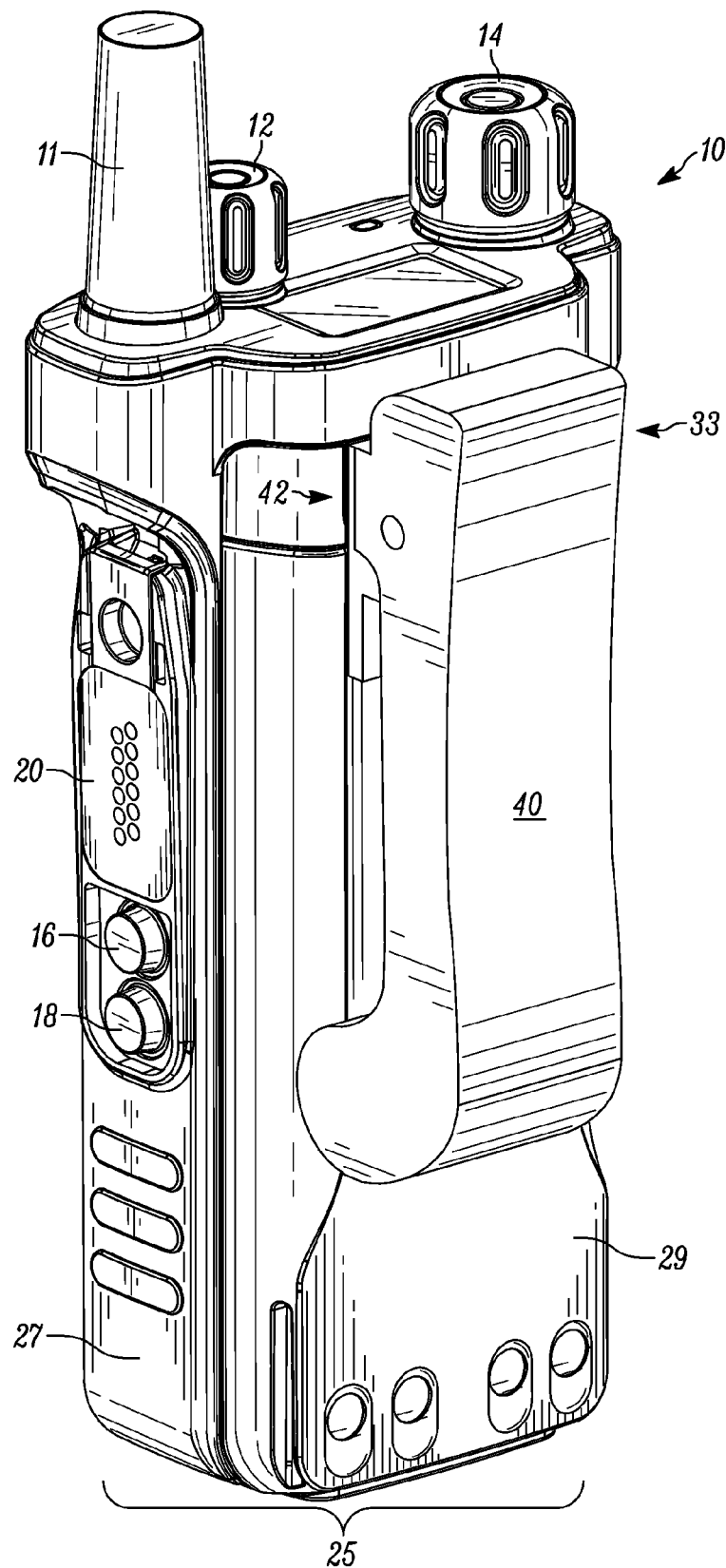
FIG. 2 is a perspective view of the portable communication device of FIG. 1 having a battery accessory interface and an active belt clip electrically connected to the battery accessory interface.

FIG. 2 illustrates the portable communication device 10 having an active belt clip 40. The active belt clip 40 includes a connector 42 that is inserted into the battery accessory interface 33. As will be described in greater detail below, the active belt clip 40 includes a load (for example, an electric motor used to create vibration).

Figure 3:
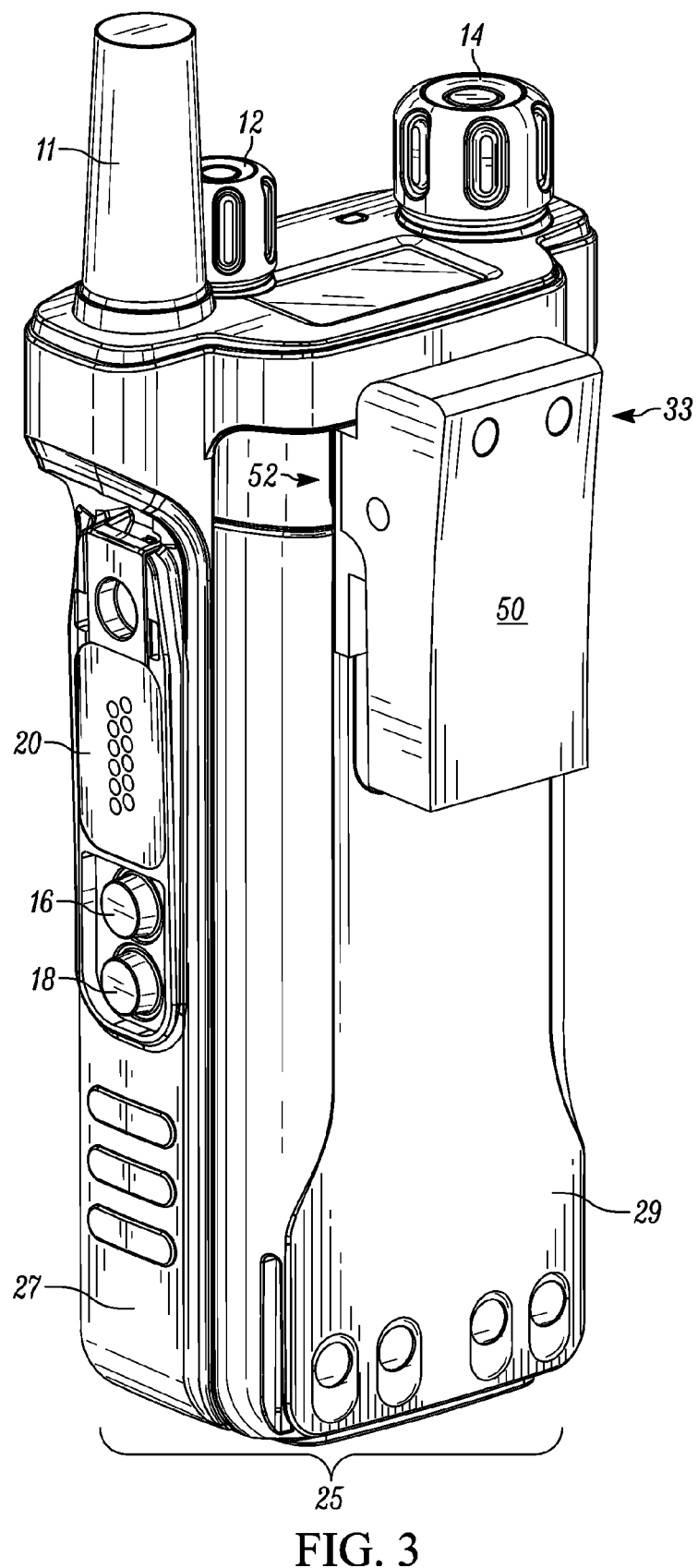
FIG. 3 is a perspective view of the portable communication device of FIG. 1 having an accessory connected to the battery accessory interface.

FIG. 3 illustrates the portable communication device 10 having an accessory 50. The accessory 50 may be, for example, a vibrator, an environmental sensor or detector (such as a gas detector), a physiological detector to detect or sense physiological activity of the user (such as a respiratory detector), or a light (such as a flash light). In the embodiment shown, the accessory 50 includes a connector 52 that is inserted into the battery accessory interface 33.

Figure 4:
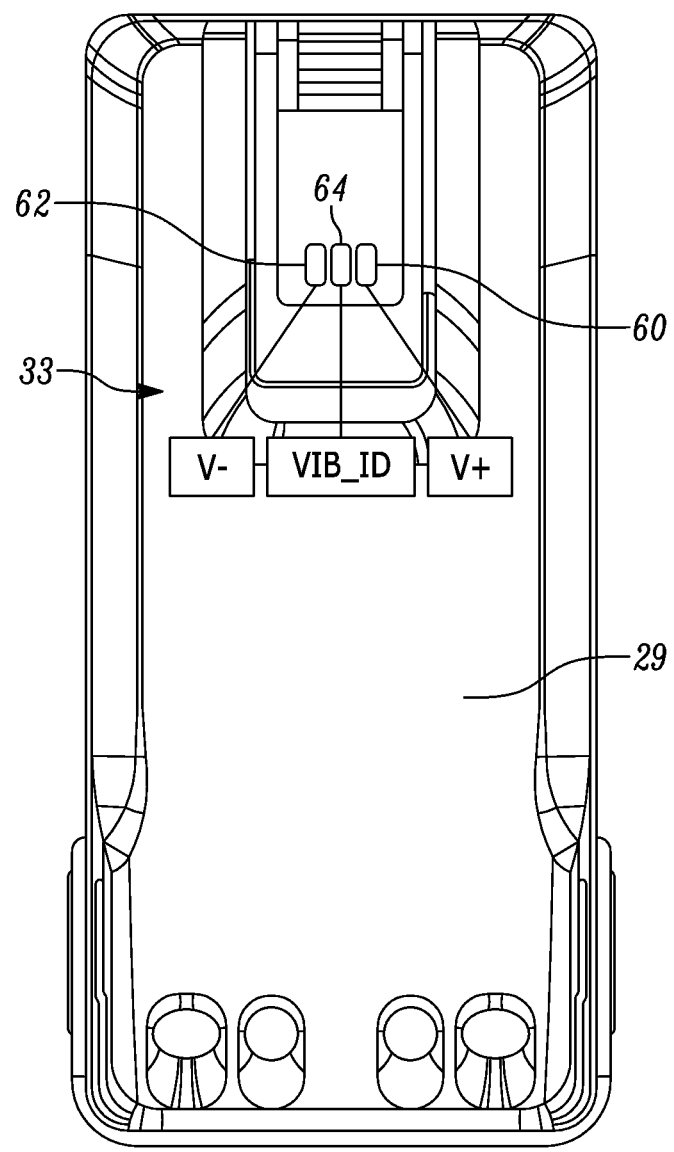
FIG. 4 is a front view of a battery accessory interface in accordance with some embodiments.

FIG. 4 is a front view of the battery accessory interface 33. In the example illustrated, the battery accessory interface 33 includes a positive pad or terminal 60 (annotated as "V+" in the example shown) and a negative pad or terminal 62 (annotated as "V−" in the example shown) and an identifying pad or terminal 64 (annotated as "VIB_ID" in the example shown). In the embodiment shown in FIG. 4, the terminals 60, 62, and 64 are recessed in the second portion 29 of the housing 25 to help prevent accidental shorting of the terminals, particularly terminals 60 and 64. As will be discussed below, FIG. 4 illustrates one embodiment of the battery accessory interface 33. Alternative configurations are possible. The battery accessory interface 33 also includes a mechanical coupler (for example, mating grooves and rails) to allow an accessory (for example, the active belt clip 40) to be selectively and securely mechanically attached to the portable communication device 10. Since known mechanical connections may be utilized, additional details regarding these features are not discussed herein.

Figure 5:
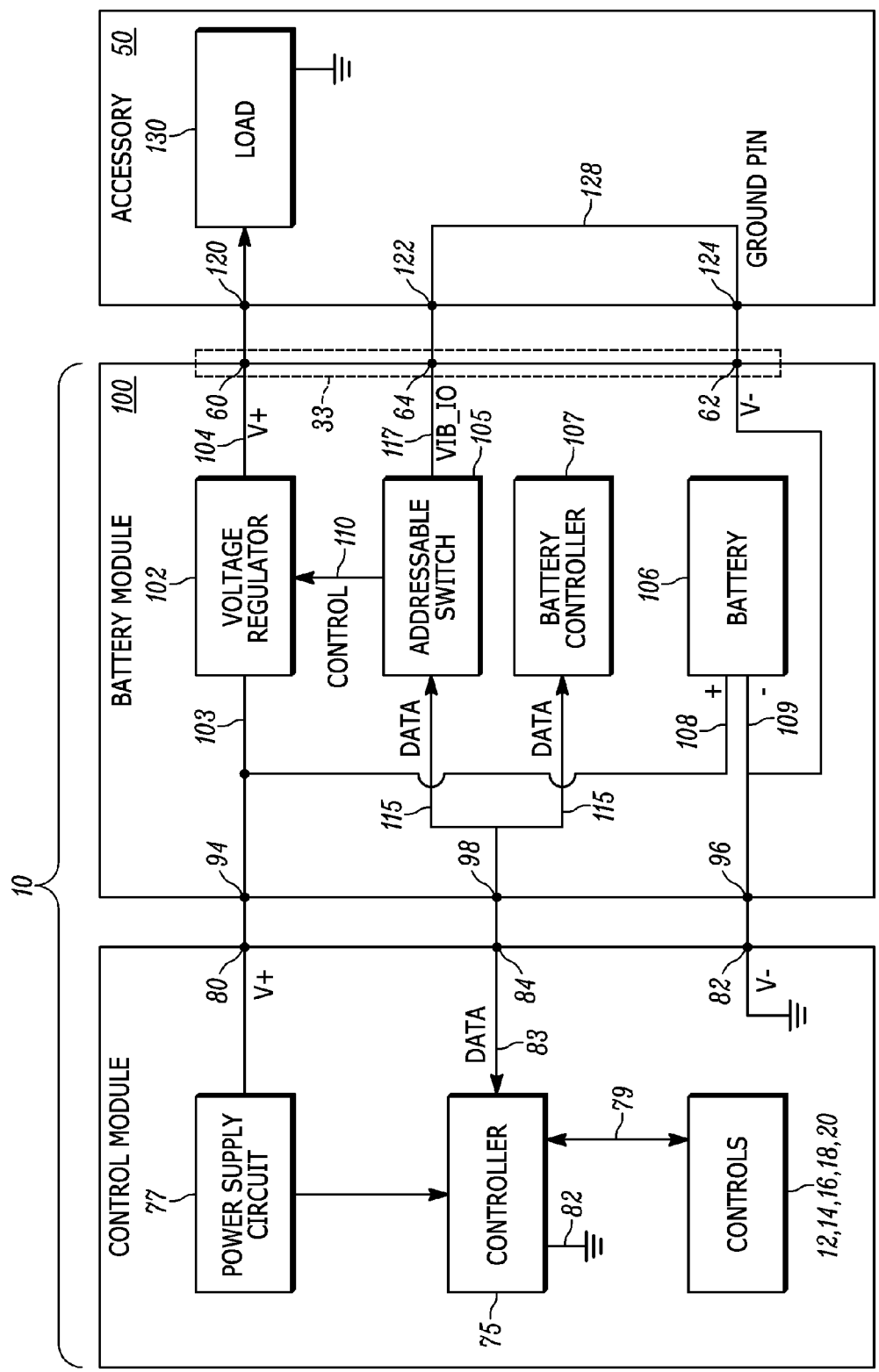
FIG. 5 is a schematic diagram illustrating electrical connections between a portable communication device, the battery accessory interface, and an accessory.

FIG. 5 is a schematic diagram illustrating the electrical connections between the battery accessory interface 33 and the accessory 50. In the embodiment illustrated, the portable communication device 10 includes a controller 75 which is connected to a power supply circuit (power supply) 77. The power supply 77, for example, conditions power received from one or more batteries (discussed below) and is connected to the controller 75. As would be apparent to an individual of ordinary skill in the art, the controller 75 may include a microprocessor or a similar device; memory, non-transitory computer-readable media, or both; and appropriate input and output devices or interfaces. The memory of the controller 75 may include one or more software programs, including executable programs for implementing various known operations of the portable communication device 10 as well as all or part of methods, processes, and operations described herein.

The controller 75 receives signals from the controls (i.e., the knobs 12 and 14, control buttons 16 and 18, and push-to-talk button 20 discussed previously herein) over line 79. In FIG. 5, the controls are illustrated schematically. The power supply 77 is connected to a positive voltage terminal 80, which may also be referred to as a device positive voltage terminal 80. The controller 75 is connected to a negative voltage or ground terminal 82, which may also be referred to as a device ground terminal 82. The controller 75 receives data over a local bus 83 connected to a data terminal 84, which may also be referred to as a device data terminal 84.

In the embodiment illustrated, the power supply 77, controller 75, and controls 12, 14, 16, 18, and 20 are part of a control module 90. In addition, in the embodiment illustrated, the battery accessory interface 33 is part of a battery module 100 that includes a positive voltage terminal 94 coupled to the positive voltage terminal 80; a negative terminal 96 coupled to the ground terminal 82; and a battery data terminal 98 coupled to the data terminal 84. The battery module 100 further includes a voltage regulator 102 having an input port 103 coupled to the positive terminal 94 and an output port 104 coupled to the terminal 60. In one embodiment, the voltage regulator 102 may be an adjustable voltage regulator such as one from the LP29xx family of devices (for example, LP2952 and LP2992) available from Texas Instruments, Inc. The battery module 100 also includes an addressable switch 105. In one embodiment, the addressable switch may be a switch from the DS240X family of devices (for example, DS2406 and DS2408) available from Maxim Integrated Products, Inc. A battery 106 in the battery module 100 is controlled by a battery controller 107. The battery 106 includes a positive terminal 108 and a negative terminal 109. Although a single battery 106 is illustrated, it should be understood that multiple batteries, cells, or similar devices or sources of power could be used in various embodiments. The voltage regulator 102 outputs a voltage on positive terminal 60 in response to a control signal received from the addressable switch 105 and provided on line 110. The addressable switch 105 communicates with the controller 75 and battery controller 107 over local bus 115. The addressable switch 105 also includes a ground pin or line 117 that is connected to identifying terminal 64.

The accessory 50 includes a positive terminal 120, an identifying terminal 122, and a negative or ground terminal 124, which may also be referred to as an accessory positive terminal 120, an accessory identifying terminal 122, and an accessory ground terminal 124, respectively. The identifying terminal 122 and ground terminal 124 are connected to each other (or shorted) via a connection 128. The accessory also includes a load 130. The load 130 may be one of a number of components depending on the configuration of the accessory 50. As mentioned above the accessory may be one or more of a vibrator, an environmental sensor or detector, a physiological detector, a light, or other device. Thus, the load may be a functional component such as a motor, sensor, detector, or a lamp, light emitting diode (LED), or an LED array, for example. When the accessory 50 is connected to the battery accessory interface 33, connections are made between positive terminal 60 and positive terminal 120, identifying terminal 64 and identifying terminal 122, and negative terminal 62 and ground terminal 124. Since identifying terminal 122 is connected to ground terminal 124, the addressable switch 105 receives a ground signal on line 117. The ground signal closes a power circuit loop of the addressable switch 105, thereby enabling (turning on) the addressable switch 105. Accordingly, the addressable switch 105 is disabled (off) unless an accessory 50 is attached to provide a ground signal on line 117 and complete the power circuit loop. Thus, the addressable switch 105 does not drain power from the battery 106 when no accessory is present or when a passive accessory (for example, belt clip 35) is attached.

The addressable switch 105 utilizes the ground signal as an indicator of the presence of the accessory or, more particularly, the connection between the accessory 50 and the battery accessory interface 33. The addressable switch 105 provides a signal to the controller 75 over the local bus 115 indicating the presence of the accessory 50. The controller 75 may provide a control signal to the addressable switch 105. The addressable switch 105 generates or outputs a control signal to the voltage regulator 102 based on the input from the controller 75 and the identifying terminal 64. As noted above, the voltage regulator 102, in turn, outputs a voltage signal to positive terminal 60, thereby providing a voltage to the accessory 50. The accessory 50 operates in response to the voltage provided to it.

In some embodiments, the only information provided to the addressable switch 105 via the line 117 is the existence of a connection between the battery accessory interface 33 and the accessory 50, and the addressable switch 105 operates independently of control from the controller 75. In such an embodiment, the control signal from the addressable switch 105 to the voltage regulator 102 causes the voltage regulator 102 to produce a predetermined output such as a direct current (DC) voltage at a predetermined level. In some embodiments, the predetermined output may be a pulse-width modulated (PWM) signal output at a predetermined duty cycle or other manner.

In some embodiments, the addressable switch 105 controls the voltage regulator 102 (and, thereby, the accessory 50) dependent on control signals from the controller 75 provided via data terminal 84. For instance, where the active belt clip 40 is attached to the battery accessory interface 33 as the accessory 50, the controller 75 generates control signals to the addressable switch 105 in response receiving an incoming radio message or call. In turn, the addressable switch 105 controls the voltage regulator 102 to drive the load 130 (for example, a vibrator or motor), providing a notifying vibration to the user.

In another example, the controller 75 generates control signals to the addressable switch 105 in response to particular user inputs via the knobs 12 and 14, control buttons 16 and 18 (hard keys), or via other input devices, for example, soft keys on a graphical user interface, of the personal communication device 10. In response to the control signals, the addressable switch 105 controls the voltage regulator 102, which drives the accessory 50. In one example, the accessory 50 is a flashlight and the load 130 includes one or more LEDs. Additionally, the control button 16 is assigned to be an accessory enable/dim/disable button by the controller 75, and, by depressing the button 16, allows a user to cycle through three settings: LEDs on 100%, LEDs on 50%, and LEDs off. In response to a user pressing the control button 16, the controller 75 outputs a control signal indicative of the selected setting to the addressable switch, which controls the voltage regulator 102 to output an appropriate PWM signal to the load 130 (for example, a signal having a 100% duty cycle, 50% duty cycle, or 0% duty cycle).

Figure 6:
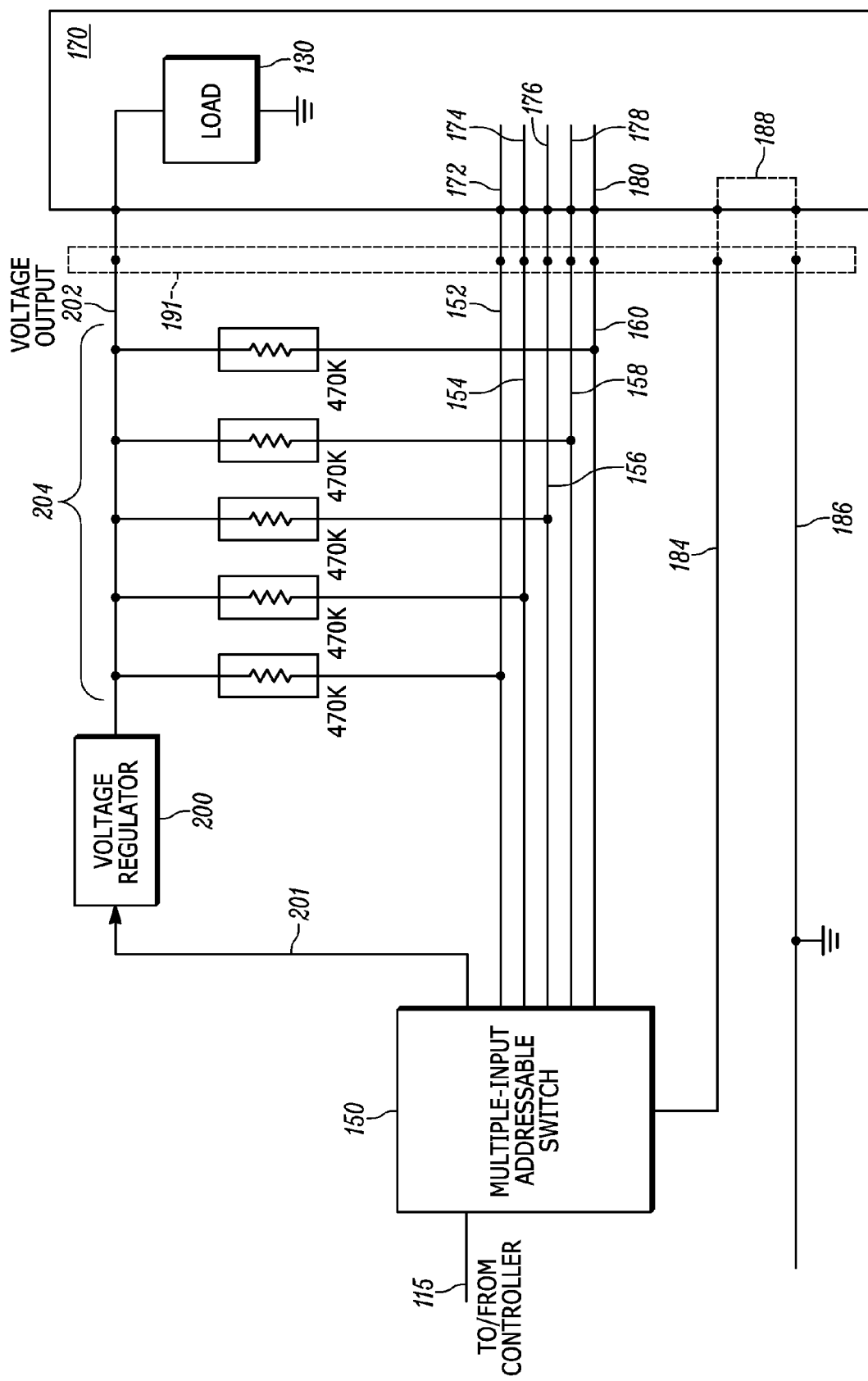
FIG. 6 is a circuit diagram illustrating an alternative embodiment having an enhanced battery accessory interface.

FIG. 6 illustrates a portion of the components in the battery module 100 in an embodiment where enhanced addressing capabilities are provided in order to more specifically identify the type of accessory 50 connected to the portable communication device 10 and to provide more particular control to the load 130 of the accessory 50. As will be explained in greater detail, instead of the single identifying terminal 64 described above, a battery accessory interface having multiple identifying terminals may be implemented.

In the embodiment shown, a multiple-input addressable switch 150 is connected to local bus 115. In the embodiment shown, the multiple-input addressable switch 150 includes five input pins or lines 152, 154, 156, 158, and 160 which connect to an accessory 170 with a corresponding number of terminals, terminals 172, 174, 176, 178, and 180. The multiple-input addressable switch 150 includes a ground pin or line 184 which is connected to a negative or ground terminal 186 via an internal connection 188 within the accessory 170, as described below. The embodiment in FIG. 6 includes a battery accessory interface 191.

The multiple-input addressable switch 150 is connected to a voltage regulator 200 via connection 201. The voltage regulator 200 is connected to a positive terminal 202. In the embodiment shown, the lines 152, 154, 156, 158, and 160 are connected to a resistive network 204 coupled between the positive terminal 202 and each of the lines 152, 154, 156, 158, and 160. The address information provided on the lines 152, 154, 156, 158, and 160 is provided to the multiple-input addressable switch 150 and, in turn, to the controller 75 (FIG. 5) via the local bus 115.

In one embodiment, illustrated in FIG. 7, the multiple-input addressable switch 150 includes an addressing or identification table 250 that provides accessory identification information. The identification information in the identification table 250 is correlated to the connections between the lines 152, 154, 156, 158, and 160 of the multiple-input addressable switch 150 and the terminals 172, 174, 176, 178, and 180 of the accessory 170. As can be seen by reference to the identification table 250, "open" (illustrated with an "O") and "short" (illustrated with an "S") connections are used to identify the accessory 170. For example, a connection having four opens and one short ("O O O O S") is assigned an identity of "Vibrator." When such a connection is made, the multiple-input addressable switch 150 recognizes the accessory 170 as a vibrator accessory. When the multiple-input addressable switch 150 also receives an indication from the portable communication device 10 via the local bus 115 that operation in, for example, a vibration mode is desired, the multiple-input addressable switch 150 provides a control signal to the voltage regulator 200. The voltage regulator 200 provides a voltage to the accessory 170 and the accessory 170 operates (in this case, vibrates). In the embodiment of identification table 250 shown, two additional examples are provided. Three opens, one short, and one open ("O O O S O") is assigned an identity of "Flash Light." Three opens and two shorts ("O O O S S") is assigned an identity of "Gas Detector." As shown in identification table 250, in an embodiment with five input lines, the multiple-input addressable switch 150 is capable of identifying 32 (or $2^5$), different types of accessories.

In some embodiments, upon connection of an accessory 170 to the battery module 100 of FIG. 6, the terminals 184 and 186 are connected via line 188 of the accessory 170 to provide the addressable switch 150 a ground connection. Upon receipt of the ground connection, the addressable switch 150 is enabled (turned on), and it provides a control signal to the voltage regulator 200 that causes the regulator to output voltage on pin 202. The accessory 170, via the terminals 172, 174, 176, 178, and 180, connects to ground and leaves open select terminals 152, 154, 156, 158, and 160 to provide the identifying information to the multiple-input addressable switch 150 as described above.

Figure 8:
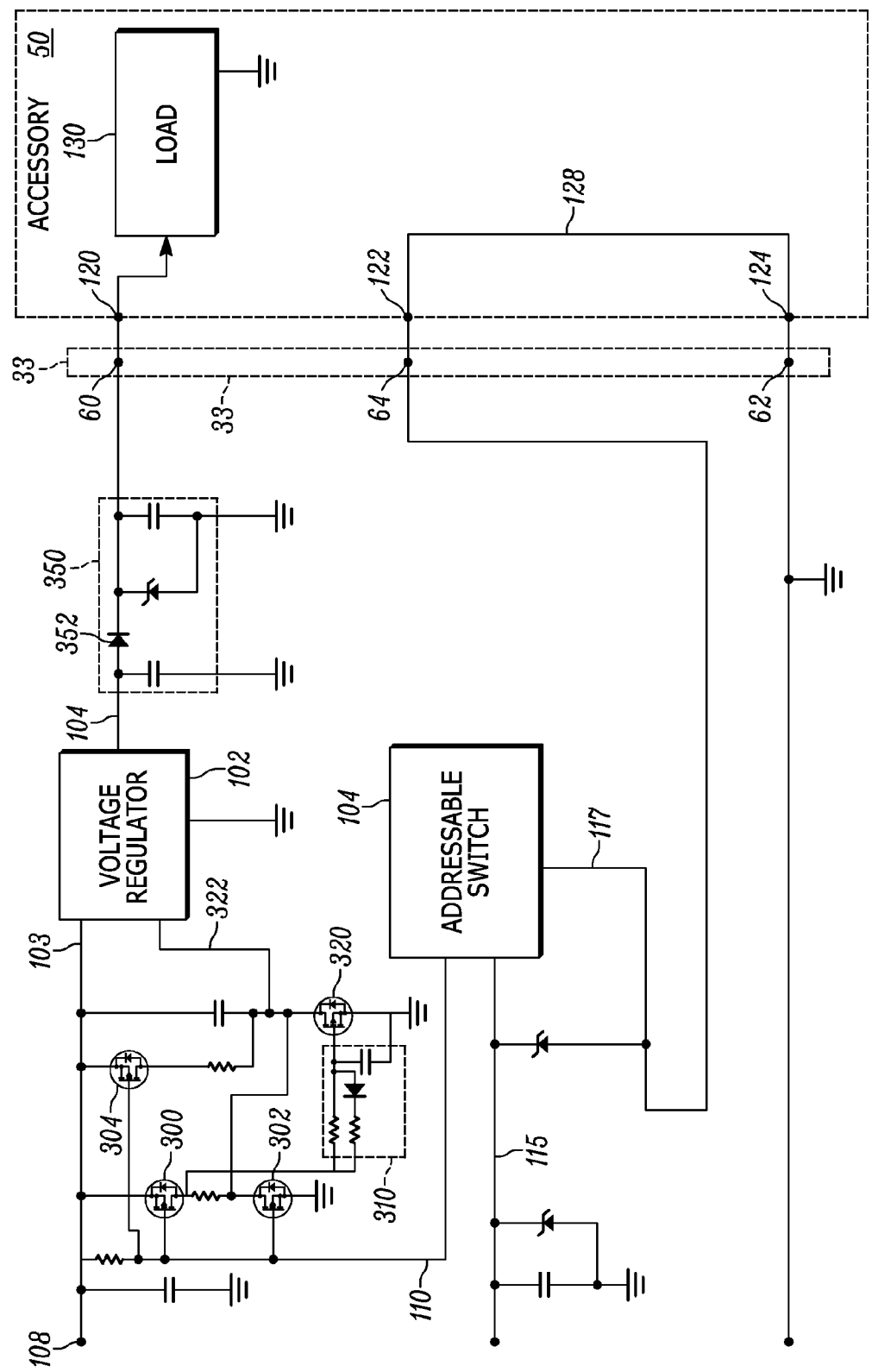
FIG. 8 is a circuit diagram of the battery accessory interface shown in FIG. 5.

FIG. 8 is a circuit diagram illustrating the battery accessory interface 33, and additional details regarding components of the battery module 100. In the embodiment illustrated, the voltage regulator 102 controls a pair of transistors 300 and 302. The transistors 300, 302, and 304 are connected to a resistor-capacitor (RC) circuit 310 which is, in turn connected to a shut-off transistor 320. The transistor 304 assists in reducing leakage current. The resistor-capacitor circuit 310 in connection with the shut-off transistor 320 provides a timing or shut-off function whereby the voltage regulator 102 may be turned off by turning on the shut-off transistor 320 and grounding an on/off input 322 of the voltage regulator 102. Values of the resistor and capacitor components in the resistor-capacitor circuit 310 may be selected as desired to control the timing of the shut-off function. For example, the values may be chosen such that the shut-off transistor 320 is turned on approximately six seconds after the voltage regulator 102 receives a control signal from the addressable switch 105. The shut-off feature just described can help protect the accessory in the event of a malfunction of the controller 75. For example, if the controller 75 malfunctions and continues to provide a signal that the accessory 50 should activate (vibrate), the shut-off feature may intervene to turn the accessory 50 off and, for example, prevent undesired discharge or drain of the battery 106.

In addition to having features to protect the accessory 50, certain embodiments may include a surge protection circuit 350 that includes a diode 352 to protect against "back feed" or surges that may originate from positive terminal 60.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery module for a portable communication device having a controller, the battery module comprising:
   a battery accessory interface having a positive terminal, an identifying terminal, and a negative terminal;
   a voltage regulator connected to the positive terminal of the battery accessory interface and configured to output a voltage on the positive terminal in response to a control signal;
   an addressable switch connected to the identifying terminal of the battery accessory interface, the addressable switch configured to communicate with the controller and generate the control signal based on input from the controller and the identifying terminal;
   a positive voltage terminal coupled to an input port of the voltage regulator and configured to be coupled to a device positive voltage terminal of the portable communication device;
   a negative voltage terminal coupled to the negative terminal and configured to be coupled to a device ground terminal of the portable communication device;
   a battery data terminal coupled to the addressable switch and configured to be coupled to a device data terminal of the portable communication device to connect the addressable switch to the controller;
   a battery for providing a voltage to the positive terminal; and
   a housing;
   wherein the voltage regulator, the addressable switch, and the battery are located within the housing.

2. The battery module of claim 1, wherein the addressable switch is a multiple-input addressable switch.

3. The battery module of claim 2, wherein the addressable switch includes an identification table that provides accessory identification information.

4. The battery module of claim 3, where in the accessory identification information is correlated to connections between the multiple-input addressable switch and an accessory.

5. The battery module of claim 1, wherein the voltage regulator produces a predetermined output in response to the control signal.

6. The battery module of claim 1, further comprising a housing and wherein the positive terminal, the identifying terminal, and the negative terminal are recessed in the housing.

7. The battery module of claim 1, further comprising a user interface having at least one selected from a group of soft keys on a graphical user interface and hard keys on a housing of the portable communication device, and the controller generating the input to the addressable switch based on user input received via the user interface.

8. The battery module of claim 1, wherein a ground pin of the addressable switch is connected to a terminal of the battery accessory interface and connects to ground upon an accessory being connected to the battery accessory interface, and wherein the addressable switch is enabled upon this connection of the ground pin to ground.

9. A portable communication device comprising:
a housing;
a battery accessory interface having a positive terminal, an identifying terminal, and a negative terminal;
a battery for providing a voltage to the positive terminal;
a voltage regulator, having an input port connected to the positive terminal of the battery accessory interface and configured to output a voltage on the positive terminal in response to a control signal;
an addressable switch connected to the identifying terminal of the battery accessory interface, the addressable switch configured to communicate with a controller and generate the control signal based on input from the controller and the identifying terminal;
an accessory having a load, an accessory positive terminal, an accessory identifying terminal, and an accessory ground terminal, the accessory identifying terminal and accessory ground terminal connected to each other, the accessory connected to the battery accessory interface;
a positive voltage terminal coupled to the input port of the voltage regulator and configured to be coupled to a device positive voltage terminal of the portable communication device;
a negative voltage terminal coupled to the negative terminal and configured to be coupled to a device ground terminal of the portable communication device; and
a battery data terminal coupled to the addressable switch and configured to be coupled to a device data terminal of the portable communication device to connect the addressable switch to the controller;
wherein the voltage regulator, the addressable switch, and the battery are located within the housing.

10. The portable communication device of claim 9, wherein the addressable switch is a multiple-input addressable switch.

11. The portable communication device of claim 10, wherein the addressable switch includes an identification table that provides accessory identification information.

12. The portable communication device of claim 10, wherein the accessory identification information is correlated to connections between the multiple-input addressable switch and the accessory.

13. The portable communication device of claim 9, wherein the voltage regulator produces a predetermined output in response to the control signal.

14. The portable communication device of claim 9, further comprising a housing and wherein the positive terminal, the identifying terminal, and the negative terminal are recessed in the housing.

15. The portable communication device of claim 9, further comprising a user interface receiving user input, the controller generating the input to the addressable switch based on the user input.

16. The portable communication device of claim 15, further comprising a user interface including at least one selected from a group of a graphical user interface with soft keys that receive the user input and hard keys on a housing of the portable communication device.

17. The portable communication device of claim 9, wherein a ground pin of the addressable switch is connected to ground upon the accessory being connected to the battery accessory interface, and wherein the addressable switch is enabled upon this connection of the ground pin to ground.

* * * * *